Jan. 30, 1968 D. N. SUMMERFIELD 3,366,812
DISTRIBUTED FIELD STATOR FOR UNIVERSAL OR D.C. MOTORS
Filed Oct. 11, 1965
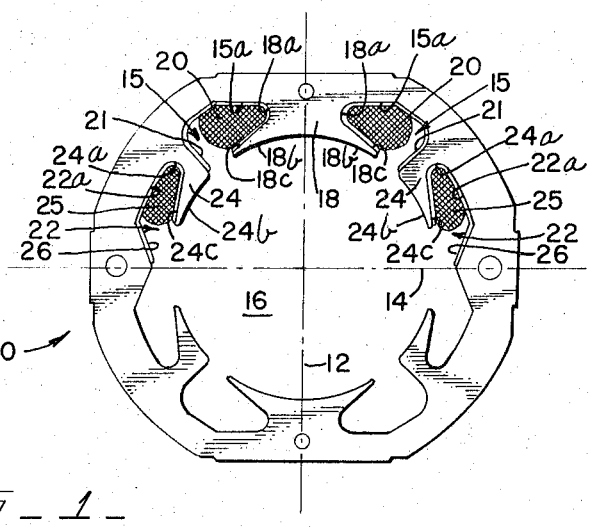
Fig-1-
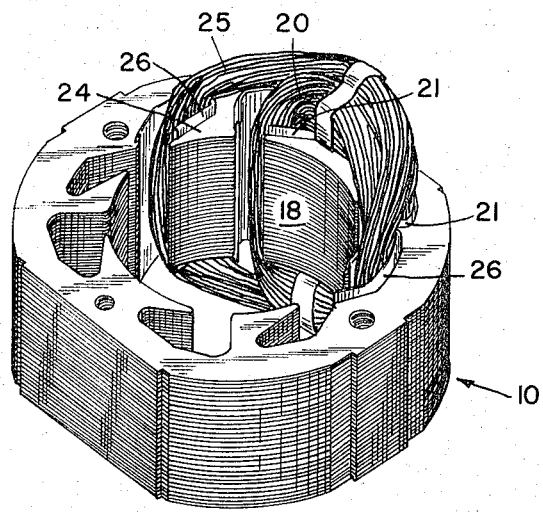
Fig-2-
INVENTOR
DAVID N. SUMMERFIELD
BY Greist, Lockwood, Greenawalt
and Dewey
ATT'YS United States Patent Office 3,366,812
Patented Jan. 30, 1968

3,366,812
DISTRIBUTED FIELD STATOR FOR UNIVERSAL OR D.C. MOTORS
David N. Summerfield, Glen Ellyn, Ill., assignor to Skil Corporation, Chicago, Ill., a corporation of Delaware
Filed Oct. 11, 1965, Ser. No. 494,366
5 Claims. (Cl. 310—254)

ABSTRACT OF THE DISCLOSURE

Each pole of the stator is formed by the following construction. The stator core has a first pair of slots of generally recumbent U-shape defining a first inwardly extending core projector symmetrical with the polar axis. A first set of coil windings is wound in these slots. The stator core has a second pair of slots of generally inverted U-shape and defining a pair of separate core projections which are at opposite hand with respect to each other and which are nearer the quadrature axis than the first mentioned core projection. Another set of windings is wound in the second pair of slots.

---

This invention relates in a general way to stators for universal or D.C. motors, and more particularly the invention relates to a new and improved distributed field stator for such motors.

By way of background, conventional universal or D.C. motors have stators with lumped field coils of two pole-salient pole construction. The two poles extend inwardly of the stator coil or ring defining the polar axis of the latter, each pole being defined or bordered by a pair of slots in which a single field coil lump or formation is located. The present invention has to do with a new and improved stator construction which results in an increase of the power output of such motors without an increase in the over-all size thereof, or stated another way, the present invention has to do with new and improved stator construction which will allow a reduction in the over-all size of such motors without decreasing the power output thereof.

Briefly and by way of introduction, the present invention provides a stator wherein the centrally bored core or ring includes two or more separate pairs of slots defining one of the field poles. The stator is symmetrical with respect to its polar axis. Each slot is narrow and has its throat or bottom nearer the polar axis than the other or open end of the slot; these slots extend more or less circumferentially of the stator core as opposed to extending radially. Field coils are wound in each of the slots. The areas or portions of each slot which receive the field coil windings are so configured and arranged that the field coil windings remain in place without any sort of fastening means, such as wedges. Even more importantly, the construction and arrangement of the slots permits automatic winding of the field coils. The distributed field construction of the present invention provides for a greater number of field coil windings for a given stator size thereby increasing the motor output, or stated differently, the distributed field construction of the present invention allows the field coils to be distributed or arranged in such a manner that the over-all size of the stator can be reduced without decreasing the output of the motor.

At this time, it should be mentioned that attempts have been made to provide a statisfactory universal or D.C. motor with distributed field construction. Such attempts have involved stators patterned after distributed field winding construction in induction type motors. That is, prior art universal or D.C. motors with distributed field windings have included stators with radial slots very similar or identical to those used in induction motors. Such stators have a number of disadvantages, viz., the slots are radial in their longest dimension and therefore do not allow the maximum armature diameter (or minimum stator outside diameter); the radially extending slots do not permit automatic winding of the coils therein; these radial slots require a wedge or top stick to close the open ends of the slots; these slots usually define teeth or core projections on the quadrature axis which not only are superfluous but also provide an unwanted path of armature leakage flux; stators including these radial slots have cores with essentially uniform radial width which is not preferable for universal or D.C. type motors.

Accordingly, it is a primary object of the present invention to provide a new and improved distributed field stator for universal or D.C. motors.

Another object of the present invention is the provision of a distributed field stator of the type described, wherein each pole thereof includes two or more separate pairs of slots of such configuration that the field coil windings remain in place therein without the use of separate fastening or securing means.

Still another object of the present invention is the provision of a distributed field stator of the type described, wherein each pole is defined by at least two separate pairs of slots of such configuration and arrangement that the field coils may be wound by automatic winding equipment.

Another object of the present invention is to provide a distributed field stator of the type described which has the core thereof provided with substantial unbroken spans on the polar axis for maximum flux carriage and which has a minimum span at the quadrature axis for minimizing flux leakage produced by armature cross magnetization.

Even another object of the present invention is the provision of a distributed field stator of the type described which has at least two separate pairs of slots at each pole thereof configured and arranged to accommodate a maximum number of field coil windings for a given radial thickness of the stator core.

These and other objects and advantages of the invention will become apparent from the following specification disclosing a preferred embodiment which is illustrated in the accompanying drawing wherein:

FIG. 1 is an end view, partly in section, of the stator of this invention, with the field coils at only one pole being shown; and FIG. 2 is a perspective view of the partially completed stator shown in FIG. 1.

Referring now to the drawing, the stator of this invention includes a field core, generally designated 10, and defining a polar axis 12 and a quadrature axis 14 extending at a right angle to axis 12. Since the stator is symmetrical with respect to axis 14, only the construction defining one pole of the stator will be described in detail.

The core 10 is formed of the usual laminated plate construction. Core 10 includes a first pair of slots 15 which extend axially of the core 10 and open into the central cylindrical bore 16 of the same. Therefore, the slots 15 may be termed inner slots since they open to the inner or inside of the stator core. Slots 15 define a central, inwardly extending core projection 18 which is symmetrical with respect to polar axis 12. Projection 18 includes oppositely facing, arcuate throats 18a which define the bases or bottoms of slots 15. Projection 18 also includes tips 18b disposed one on each side of polar axis 12, which tips each include a generally flat surface 18c inclined and extending away from polar axis 12 and toward quadrature axis 14. Slots 15 define generally flat surfaces 15a, which surfaces adjoin respective throats 18a. A plurality of field coil windings 20 are wound in each slot 15 and insulated from the core by cuff insulating strips 21. Of course, other suitable insulating means can be used. As noted in FIG. 1, substantially all of the windings 20 in each slot 15 are disposed in the space bounded or defined by surface 18c, throat 18a and slot surface 15a. This space, which extends axially through core 10, may be defined as being of generally recumbent U-shape in cross-section. Each space defined by surfaces 15a, 18c and throat 18a has a depth at least as great as its width at the widest portion thereof.

Core 10 includes a second pair of slots 22 extending axially of the core and forming separate side core projections 24 which are opposite hand with respect to each other. Each of these slots opens or communicates with the bore 16 and therefore may be termed inner slots. Each projection 24 includes a throat 24a defining the base or bottom of slot 22. Each projection 24 further includes a tip 24b having a generally flat surface 24c which is inclined and extends generally away from polar axis 12 and toward quadrature axis 14. Slots 22 define surfaces 22a adjoining respective throats 24a. Field coil windings 25 are wound in each slot 22 and insulated from the core by cuff insulating strips 26. By referring to FIG. 1, it will be noted that substantially all of the windings in each slot 22 are disposed in the space defined by surfaces 22a, 24c and throat 24a. This space extendes axially through core 10 and may be defined as being of inverted U-shape in cross-section. It will be noted that each of these spaces has a depth greater than its width at the widest portion thereof.

In the embodiment of the invention illustrated, field coil windings 20 are wound in a separate lump or formation in slots 15 and field coil windings 25 are wound as a separate lump or formation in slots 22. This arrangement is best illustrated in FIG. 2. Alternatively, one formation or lump of windings can be wound in one of the slots 15 on one side of polar axis 12 and the slot 22 on the other side of polar axis 12 and with the other lump or arrangement of field coil windings being wound in the remaining slot 15 and slot 22. It will also be understood that according to the present invention additional pairs of similarly shaped slots and field coil windings therefor could be provided at each pole. The number of slots and windings will depend on, among other things, the size of the stator core 10.

The stator according to the present invention possesses a number of distinct advantages, for example; the slot spaces in which the field coil windings are wound are relatively narrow and deep and extend more or less circumferentially of the core (as opposed to extending radially) allowing a given amount of windings to occupy a smaller amount of core space as measured radially of the same thereby to provide maximum motor output for a given stator size or to permit smaller stator construction without reducing the output of the motor; since the slot receiving spaces in the core extend generally away from the polar axis and toward the quadrature axis, the field coils can be wound automatically and the winding tension on each turn is in a direction such that it tends to pull the coils into the slots; because the winding receiving slot spaces extend generally away from the polar axis and toward the quadrature axis and because the winding tension on each turn tends to pull the coils into the slots, slot wedges or separate securing means are not needed to hold the windings or coils in place; central core projections 18 provide a substantial unbroken span in the core 10 for maximum flux carriage; the relatively large air gap between the armature (not shown) and the core at the quadrature axis, which gaps are defined by the open ends of slots 22, minimizes undesirable leakage of flux produced by armature cross-magnetization.

While the invention has been shown and described in but only one form, it will be obvious to those skilled in the art that it is not to be so limited. On the other hand, it will be realized that the invention is susceptible to various forms and modifications without departing from the spirit and scope of the appended claims.

I claim:

1. In a stator of the type having a centrally bored core supporting field windings defining opposite field poles on a polar axis which extends at a right angle to a quadrature axis, wherein the stator is symmetrical with respect to both of said axes, the construction for one of said poles comprising, said core having a first pair of inner slots extending axially thereof and being disposed one on each side of said polar axis as opposite hand versions of each other thereby defining a central core projection, each slot forming a core wall portion of generally recumbent U-shape with the arms of the U extending from the bight portion thereof in a direction generally away from said polar axis, each of said wall portions defining a winding receiving space having a depth at least as great as its width at the widest portion thereof, said core having a second pair of inner slots extending axially thereof and being disposed one on each side of said polar axis as opposite hand versions of each other thereby defining a pair of side core projections one on each side of the polar axis as opposite hand versions of each other, said second pair of slots being nearer said quadrature axis than said first pair of slots, each slot of said second pair of slots forming a core wall portion of generally inverted U-shape with the arms of the U extending from the bight portion thereof in a direction toward said quadrature axis, each of said second mentioned core wall portions defining a winding receiving space having a depth at least as great as its width at the widest portion thereof, each of said widths being measured along a radius of the stator core and each of said depths being measured at a generally right angle to such radius, and field coil windings in said slots with substantially all of the windings arranged in said spaces.

2. The construction according to claim 1 wherein one set of windings is in said first pair of slots and another set of windings is in said second pair of slots.

3. The construction according to claim 1 wherein said core has a greater radial thickness adjacent said second pair of slots than adjacent said first pair of slots.

4. The stator according to claim 1 wherein said second pair of slots of said one of said poles extends circumferentially of the stator toward the second pair of slots of the other pole to form substantial air gaps at opposite ends of the quadrature axis.

5. The stator according to claim 4 wherein said core has a greater radial thickness adjacent said second pairs of slots than adjacent said first pairs of slots.

References Cited

UNITED STATES PATENTS

| 1,723,912 | 8/1929 | Bergman | 310—254 |
| 2,479,329 | 8/1949 | Ellis | 310—254 |
| 2,631,251 | 3/1953 | Spielman | 310—254 |
| 2,830,209 | 4/1958 | Fleckenstein | 310—254 |
| 2,845,553 | 7/1958 | Oldenkamp | 310—172 |
| 3,007,068 | 10/1961 | Arnold | 310—187 |
| 3,153,183 | 10/1964 | Brammerlo | 310—185 |
| 3,154,708 | 10/1964 | Shaffer | 310—258 |

MILTON O. HIRSHFIELD, *Primary Examiner.*

J. W. GIBBS, L. L. SMITH, *Assistant Examiners.*